(12) United States Patent
Gibboney et al.

(10) Patent No.: US 10,377,482 B2
(45) Date of Patent: Aug. 13, 2019

(54) REMOTELY CONTROLLED MODULAR VTOL AIRCRAFT AND RE-CONFIGURABLE SYSTEM USING SAME

(71) Applicant: Transition Robotics, Inc., Santa Cruz, CA (US)

(72) Inventors: Jeffrey Kyle Gibboney, Redwood City, CA (US); Pranay Sinha, Santa Cruz, CA (US)

(73) Assignee: Transition Robotics, Inc., Santa Cruz, CA (US)

( * ) Notice: Subject to any disclaimer, the term of this patent is extended or adjusted under 35 U.S.C. 154(b) by 0 days.

(21) Appl. No.: 15/143,625

(22) Filed: May 1, 2016

(65) Prior Publication Data

US 2018/0265193 A1    Sep. 20, 2018

Related U.S. Application Data

(60) Provisional application No. 62/156,078, filed on May 1, 2015.

(51) Int. Cl.
*B64C 39/08* (2006.01)
*B64C 39/02* (2006.01)
*B64C 3/54* (2006.01)

(52) U.S. Cl.
CPC .............. *B64C 39/024* (2013.01); *B64C 3/54* (2013.01); *B64C 39/08* (2013.01); *B64C 2201/021* (2013.01); *B64C 2201/042* (2013.01); *B64C 2201/088* (2013.01); *B64C 2201/104* (2013.01); *B64C 2201/165* (2013.01)

(58) Field of Classification Search
CPC ..... B64C 3/54; B64C 39/08; B64C 2201/104; B64C 2201/021
See application file for complete search history.

(56) References Cited

U.S. PATENT DOCUMENTS 3,995,794 A * 12/1976 Lanier ..................... B64C 15/02
244/12.4
5,779,190 A    7/1998 Rambo et al.
(Continued)

FOREIGN PATENT DOCUMENTS

GB    1319223 A    6/1973

OTHER PUBLICATIONS

Internation Search Report; PCT/US/30336; dated Jan. 19, 2017.
International Preliminary Report on Patentability; PCT/US/30336; dated Nov. 7, 2017.

*Primary Examiner* — Brian M O'Hara
*Assistant Examiner* — Keith L Dixon
(74) *Attorney, Agent, or Firm* — Michael A. Guth

(57) ABSTRACT

A manned/unmanned aerial vehicle adapted for vertical takeoff and landing using the same set of engines for takeoff and landing as well as for forward flight. An aerial vehicle which is adapted to takeoff with the wings in a vertical as opposed to horizontal flight attitude which takes off in this vertical attitude and then transitions to a horizontal flight path. An aerial vehicle system which has removable wing sections which allow for re-configuration with different wing section types, allowing for configurations adapted for a particular flight profile. A method of customizing a configuration of an unmanned aerial vehicle based upon flight profile factors such as duration, stability, and maneuverability.

18 Claims, 15 Drawing Sheets

(56) References Cited

U.S. PATENT DOCUMENTS

| | | | |
|---|---|---|---|
| 6,340,134 B1* | 1/2002 | Meschino | B64C 1/26 244/130 |
| 7,210,654 B1* | 5/2007 | Cox | B64C 39/024 244/190 |
| 2007/0029440 A1* | 2/2007 | Shepshelovich | B64C 39/028 244/13 |
| 2008/0149758 A1* | 6/2008 | Colgren | B64C 9/02 244/13 |
| 2011/0042508 A1* | 2/2011 | Bevirt | B64C 15/00 244/12.4 |
| 2011/0046821 A1 | 2/2011 | Grablowsky | |
| 2012/0074264 A1* | 3/2012 | Heaton | B64C 3/385 244/213 |
| 2012/0286102 A1* | 11/2012 | Sinha | B64C 15/00 244/7 B |
| 2014/0042277 A1 | 2/2014 | Suokas | |
| 2014/0097290 A1 | 4/2014 | Leng | |
| 2017/0197715 A1* | 7/2017 | David | B64C 3/00 |

* cited by examiner

US 10,377,482 B2

REMOTELY CONTROLLED MODULAR VTOL AIRCRAFT AND RE-CONFIGURABLE SYSTEM USING SAME

CROSS-REFERENCE TO RELATED APPLICATIONS

This application claims priority to U.S. Provisional Patent Application 62/156,078 to Sinha et al., filed May 1, 2015, which is hereby incorporated by reference in its entirety.

BACKGROUND

Field of the Invention

This invention relates to powered flight, and more specifically to a vertical take-off and landing aircraft, method, and system.

Description of Related Art

VTOL capability may be sought after in manned vehicle applications, such as otherwise traditional aircraft. An unmanned aerial vehicle (UAV) is a powered, heavier than air, aerial vehicle that does not carry a human operator, or pilot, and which uses aerodynamic forces to provide vehicle lift, can fly autonomously, or can be piloted remotely. Because UAVs are unmanned, and cost substantially less than conventional manned aircraft, they are able to be utilized in a significant number of operating environments.

UAVs provide tremendous utility in numerous applications. For example, UAVs are commonly used by the military to provide mobile aerial observation platforms that allow for observation of ground sites at reduced risk to ground personnel. The typical UAV that is used today has a fuselage with wings extending outward, control surfaces mounted on the wings, a rudder, and an engine that propels the UAV in forward flight. Such UAVs can fly autonomously and/or can be controlled by an operator from a remote location. UAVs may also be used by hobbyists, for example remote control airplane enthusiasts.

A typical UAV takes off and lands like an ordinary airplane. Runways may not always be available, or their use may be impractical. It is often desirable to use a UAV in a confined area for takeoff and landing, which leads to a desire for a craft that can achieve VTOL.

SUMMARY

A manned/unmanned aerial vehicle adapted for vertical takeoff and landing using the same set of engines for takeoff and landing as well as for forward flight. An aerial vehicle which is adapted to takeoff with the wings in a vertical as opposed to horizontal flight attitude which takes off in this vertical attitude and then transitions to a horizontal flight path. An aerial vehicle system which has removable wing sections which allow for re-configuration with different wing section types, allowing for configurations adapted for a particular flight profile. A method of customizing a configuration of an unmanned aerial vehicle based upon flight profile factors such as duration, stability, and maneuverability.

DETAILED DESCRIPTION

Figure 1A:
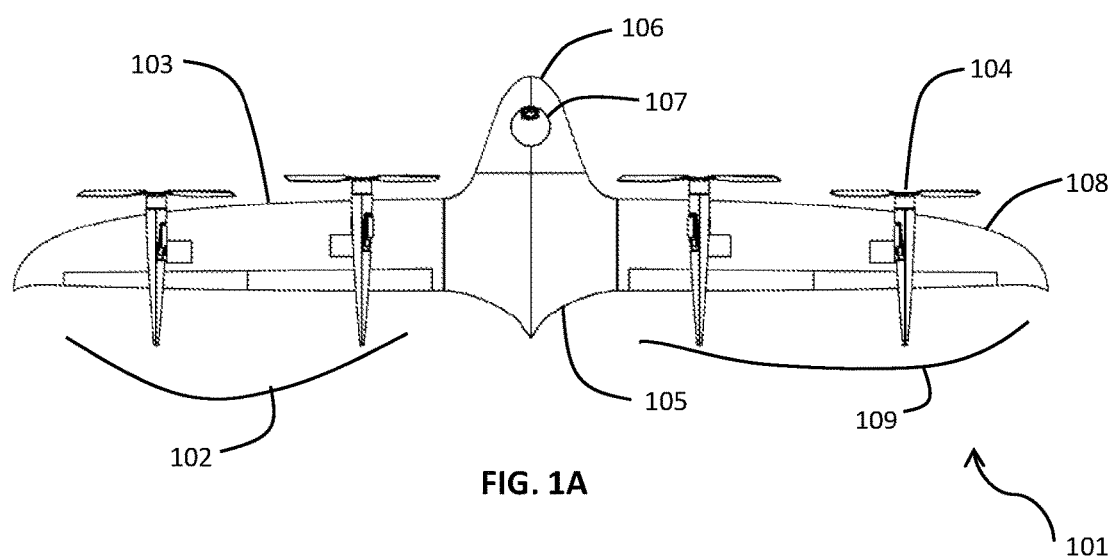
FIGS. 1A-B are views of an unmanned aerial vehicle in a vertical take-off and landing configuration according to some embodiments of the present invention.
Figure 1B:
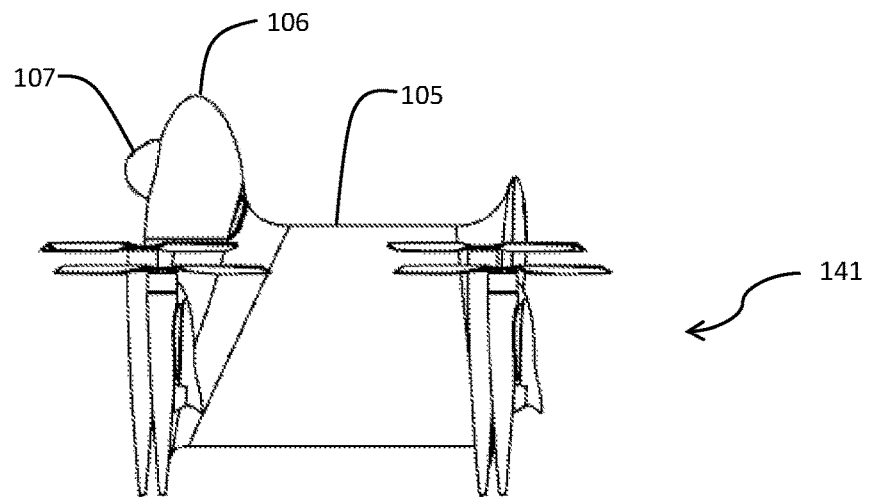

In some embodiments of the present invention, as seen in FIGS. 1A-B, a remotely piloted, autonomously controlled and/or automatically stabilized unmanned aerial vehicle 101 is seen in a vertical takeoff and landing configuration 141 with the leading edges of its two wings or four half-wings oriented skyward and the two wings or four half wing assemblies 102, 109 arranged in a biplane configuration. The four half wing assemblies 102, 109 consist of two right half wings 103 with thrust producing elements 104 and two left half wings 108 with thrust producing elements 104. In this embodiment, the vehicle 101 has upper right side wing assemblies and lower right side wing assemblies which are identical in length and wing profile. Also, the vehicle 101 has upper left side wing assemblies and lower left side wing assemblies which are identical in length and wing profile. Each of the four half wings carries two thrust producing elements 104. In an exemplary embodiment, each of the half wings has a half span of 1.0 meters and a half area, with a mean aerodynamic chord of 0.17 meters. Each of the half wings may have two control surfaces adapted to move around a pivot axis to support aerial vehicle control.

A single aerodynamic central body pylon 105 is used to connect the four half wing assemblies 102, 109 in a biplane configuration. The vehicle 101 also features a extended nose section 106 at the intersection of the aerodynamic central body pylon 105 and one or both of the wings in a biplane configuration, which may be the bottom half wing set. The aerodynamic central body pylon may be a vertical symmetric airfoil is some aspects. The transition of the vertical airfoil of the central body may include blended sections to aerodynamically blend the vertical airfoil of the central body pylon to the horizontal airfoil sections of the wings. This bulbous nose is designed to carry a payload internally or protruding from it 107. The protruding equipment portion 107 may be an imaging aperture in some embodiments. Each half wing 103, 108 in the biplane configuration and its two associated thrust producing elements 104 form a modular unit, a half wing assembly 102, 109 which can be detached from the aerodynamic central body pylon 105 to allow packing for transportation and/or to be replaced by another wing half with thrust producing elements of the same design for maintenance and repair purposes and/or with another wing half with thrust producing elements of a different design to suit the aerodynamic and thrust requirements for a variety of missions. In an exemplary embodiment, the aerodynamic central body pylon 105 is substantially a vertically oriented symmetric airfoil, which is is 0.625 meters high, 0.12 meters thick, and with a chord of 0.35 meters.

Figure 2A:
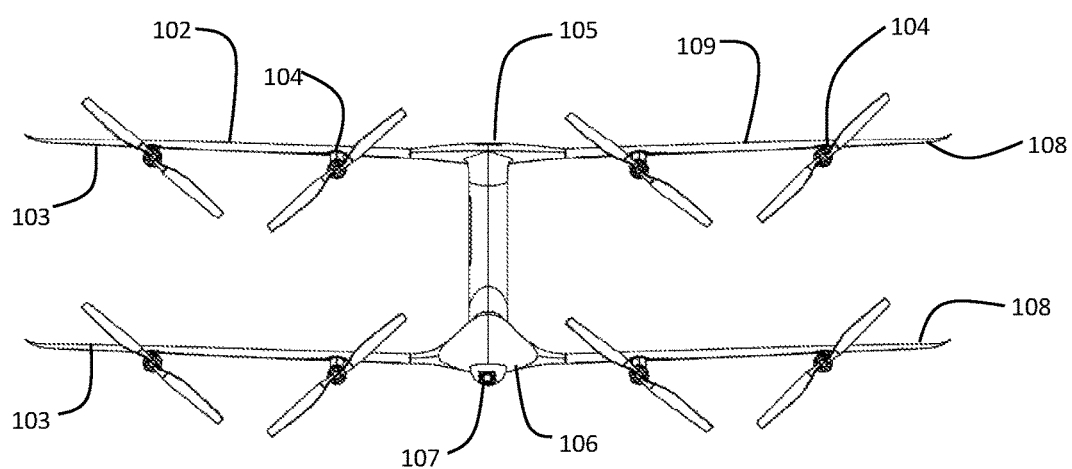
FIGS. 2A-C are views of an unmanned aerial vehicle in a horizontal regular flight configuration according to some embodiments of the present invention.
Figure 2B:
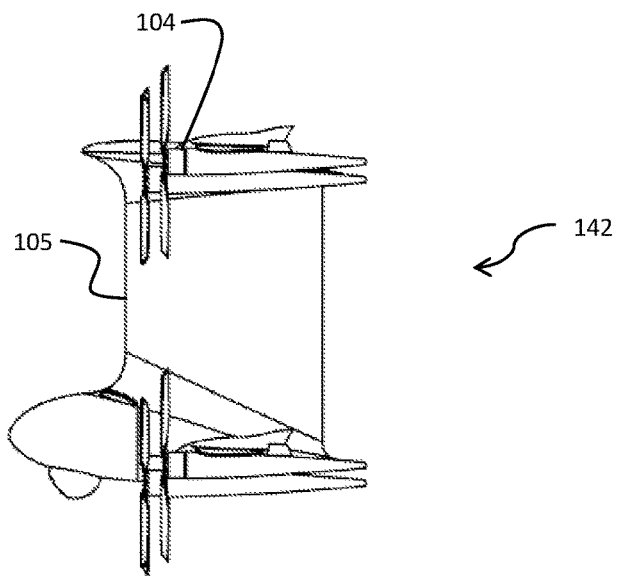
Figure 2C:
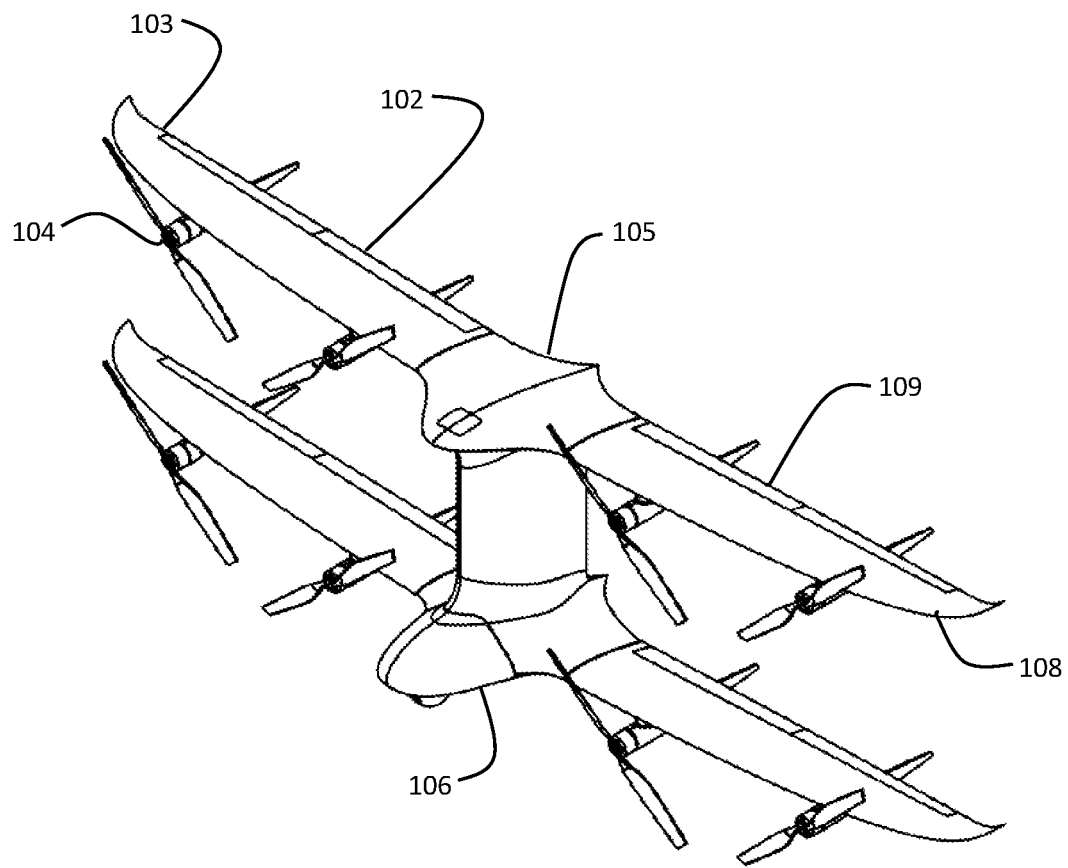

FIGS. 2A-C shows the remotely piloted, autonomously controlled and/or automatically stabilized unmanned aerial vehicle 101 in a forward flight configuration 142 with the leading edges of its two wings or four half-wings oriented in the direction of flight and the two wings or four half wings arranged in a biplane configuration. Each of the four half wing assemblies 102, 109 further carries two thrust producing elements 104. Either one or both of these thrust producing elements 104 may be active during the forward flight phase of the flight. In some embodiments, the thrust producing elements are 900 Watt continuous power brushless motors with propellers with a diameter in the range of 14-17 inches. In some embodiments, one or more of the propellers on each wing assembly may be a folding propeller adapted to fold back when not being used to support vertical take-off and landing (VTOL). In some embodiments, the outboard propellers on each wing assembly may be folding propellers. The single aerodynamic central body pylon 105 that is used to connect the four half wings in a biplane configuration is oriented as a vertical fin in the forward flight configuration. The extended nose section 106 of the vehicle 101 at the intersection of the aerodynamic pylon 105 and one of the wings in a biplane configuration is carrying a payload protruding from it 107. In the forward flight configuration, this equipment 107 has an unobstructed view in a downward pointing hemisphere. In an exemplary embodiment, the full vehicle may have an upper and lower wing which use identical right side and left wing assemblies, with an overall span of 2.4 meters, a mean aerodynamic chord (MAC) of 0.26 meters, a lifting surface area of 1.0 square meters, with a maximum take-off weight of 14.6 kg.

Figure 3A:
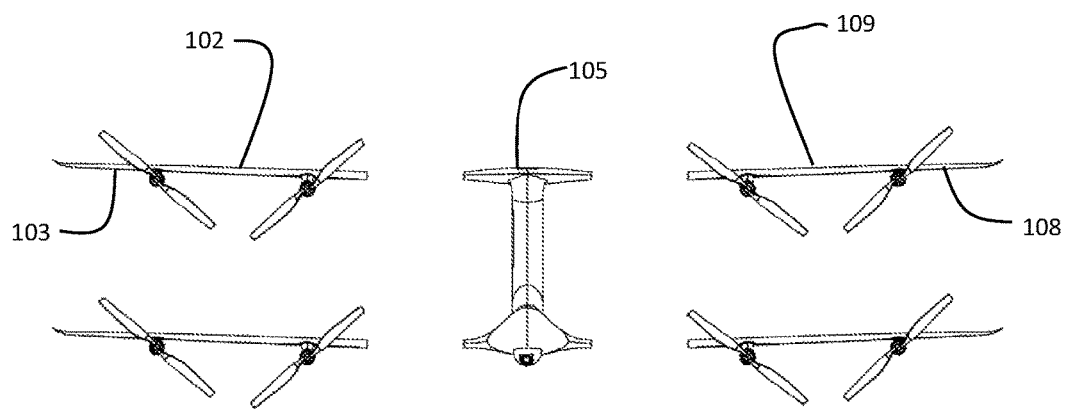
FIGS. 3A-C are views of an unmanned aerial vehicle in exploded view illustrating the modularity of the vehicle according to some embodiments of the present invention.
Figure 3B:
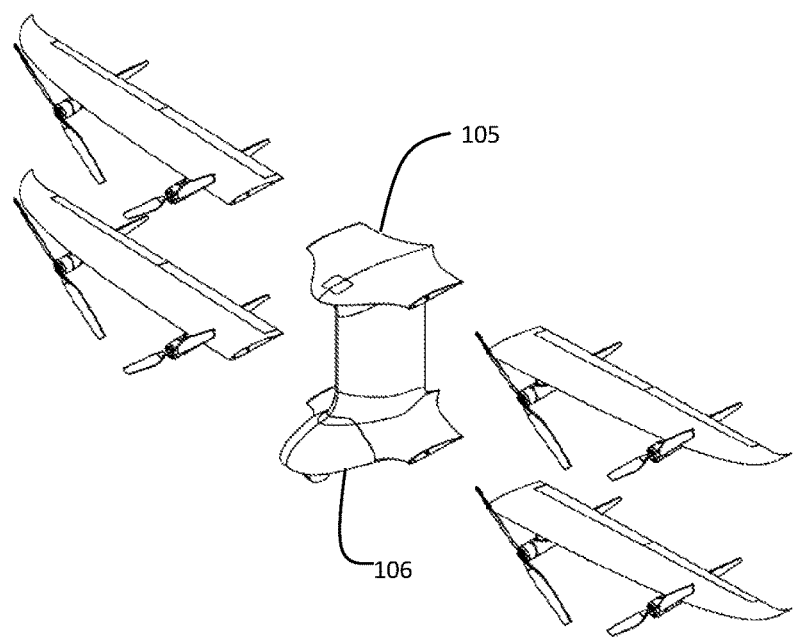
Figure 3C:
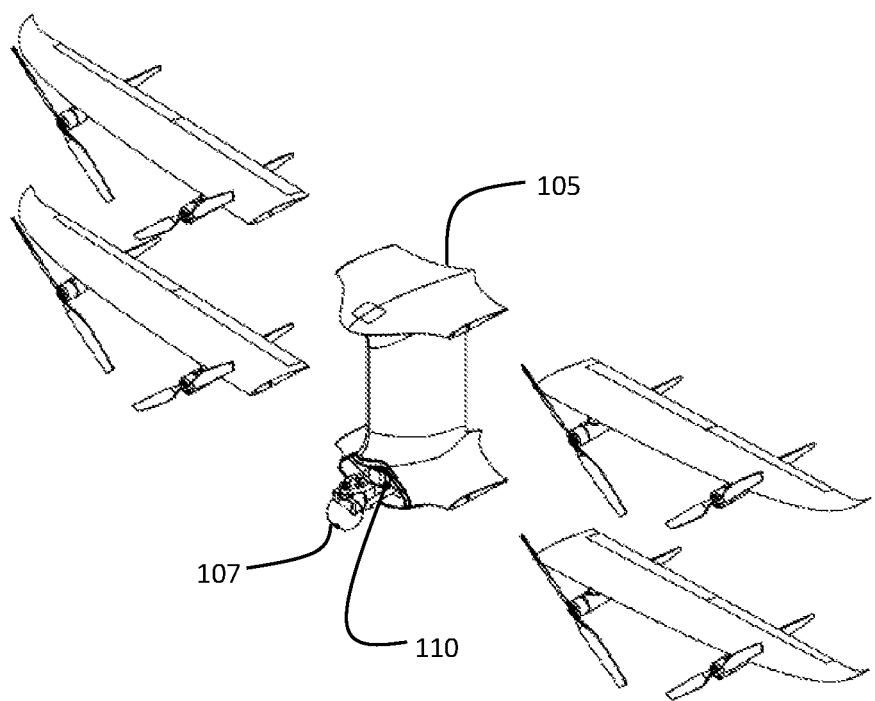

In some embodiments of the present invention, as seen in FIGS. 3A-C, the modular aspect of the aerial vehicle system is seen. The half wing assemblies 102, 109, with their associated thrust producing elements 104 and half wings 103, 108, are detached from the aerodynamic central body pylon 105 and its associated bulbous nose 106 and payload 107. The half wing assemblies 102, 109, with their associated thrust producing elements 104 and half wings 103, 108, are detached from the aerodynamic central body pylon 105 adapted to be removably attached to the central body pylon 105. The vehicle's extended nose section 106 is also adapted to be removable from the aerodynamic central body pylon 105, in order to allow access to the payload 107 through an opening 110 in the extended nose section 105. The extended nose 106 can, in some embodiments, be removed and replaced with a nose of a different design to accommodate different payloads. In addition, the modular aspect of the aerial vehicle system allows for re-configuration of the vehicle system with differing wing set types. The removable half wing assemblies may be coupled to the central body pylon 105 such that both structural attachment is achieved, as well as electrical coupling of the thrust assemblies 104 and other aspects, such as control surface controlling mechanisms. In such a system, the central body pylon 105 may house aspects of the system which may be common to all configurations, such as the control electronics, battery packs (or other power source), and attitude sensors. Another modular aspect is the interchangeability of the extended nose with other profiles, allowing for the use of differing imaging payload packages, for example.

In some embodiments, the central body pylon may allow for the through insertion of cross spars adapted to be inserted a partial distance into the adjoining portions of the half wings to allow for structural coupling of the central body pylon to the half wings, and by extension of the right half wings to the left half wings, and of the upper half wings to the lower half wings. Electrical connectivity may be implemented with wiring harnesses and connectors, and through other means.

Figure 4A:
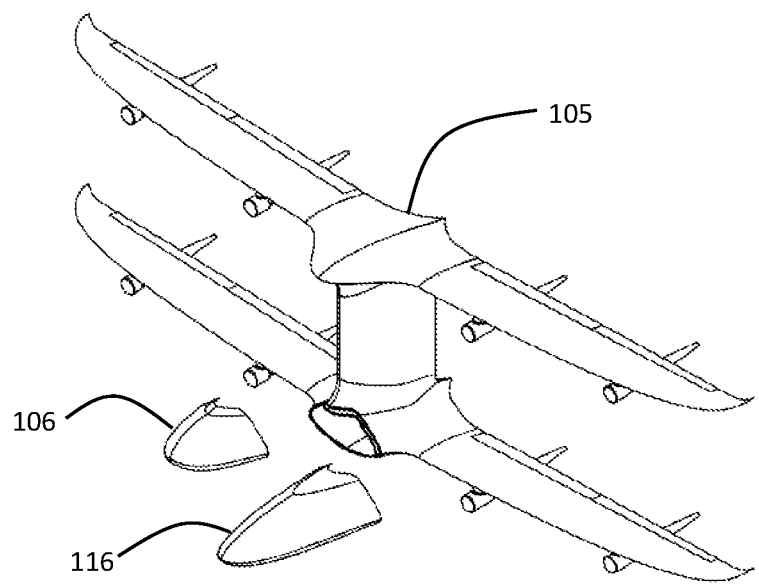
FIGS. 4A-B are views of an unmanned aerial vehicle with different extended nose sections according to some embodiments of the present invention.
Figure 4B:
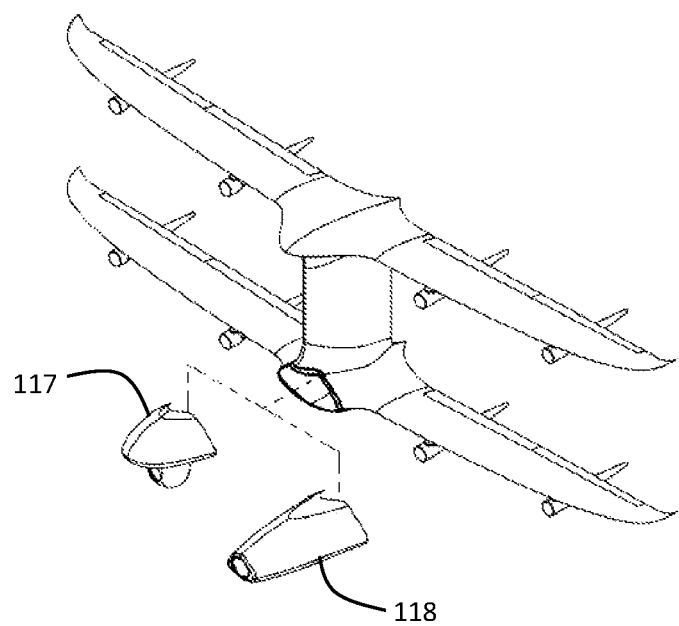
Figure 5A:
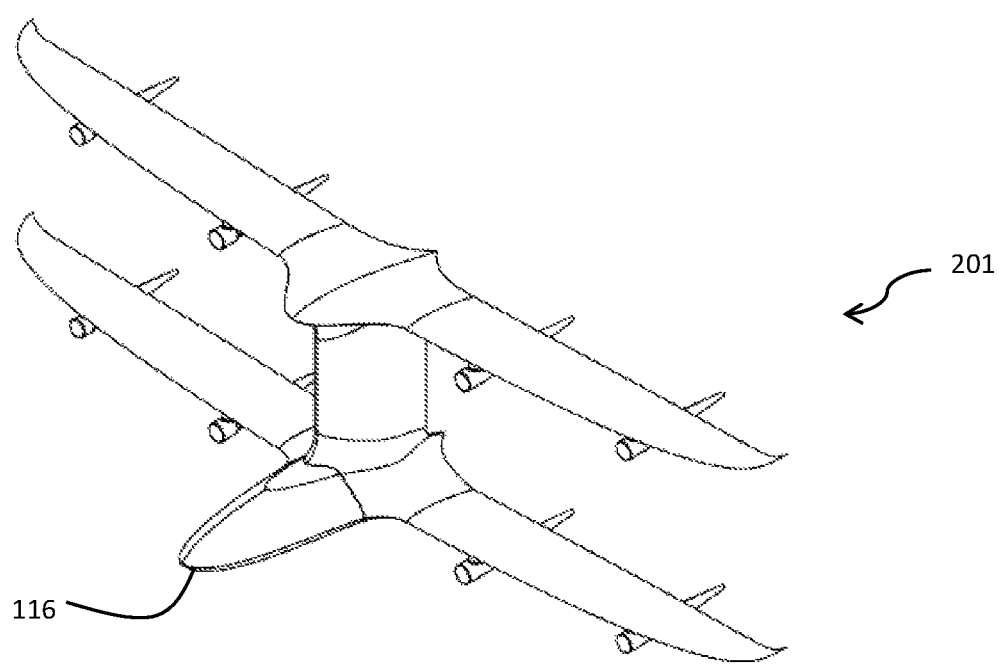
FIGS. 5A-B are views of an unmanned aerial vehicle with different extended nose sections according to some embodiments of the present invention.
Figure 5B:
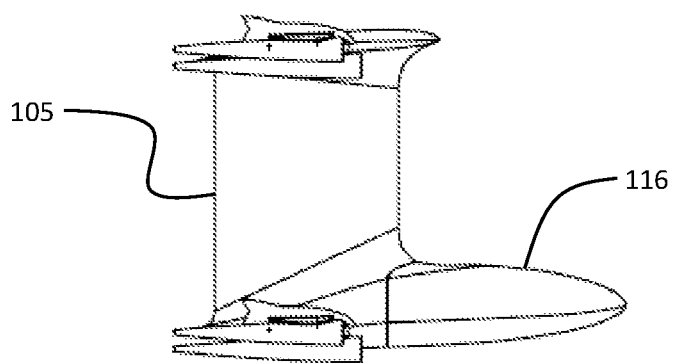

FIGS. 4A-B illustrate the modularity aspect of the extended nose section. Depending upon the flight profile of the flight of the vehicle, and/or the type of payload to be carried during such a flight, varying types of extended nose sections 106, 116, 117, 118 may be used. In some aspects, an extended nose section may include access for an imaging device, or sensor, to protrude through the nose section to facilitate imaging. In some aspects, the extended nose section allows for imaging downward with an unobstructed field of view. FIGS. 5A-B illustrate a configuration of the vehicle system using a long version extended nose section 116 attached to the aerodynamic central body pylon 105. Different extended nose sections may better facilitate differing payloads. Exemplary payloads may include a stabilized gimbal visual imaging system, a stabilized combined visual/infrared imaging system, LIDAR systems, and hyperspectral imaging systems.

Figure 6A:
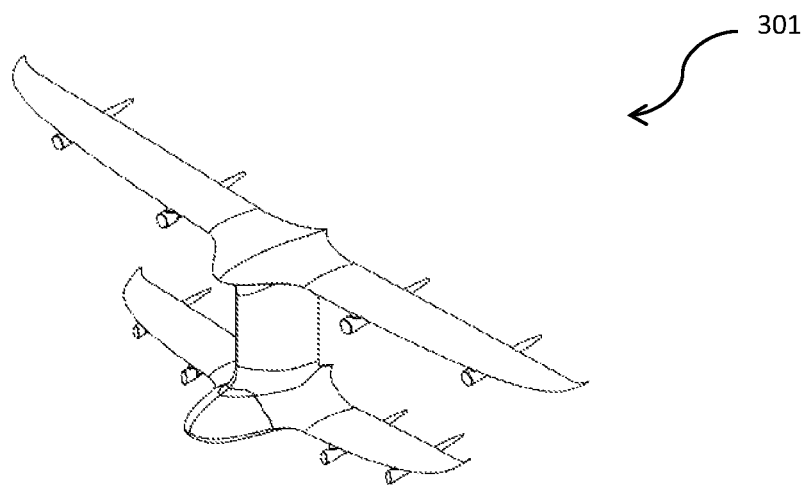
FIGS. 6A-C are views of a second embodiment of an unmanned aerial vehicle in a horizontal regular flight configuration according to some embodiments of the present invention.
Figure 6B:
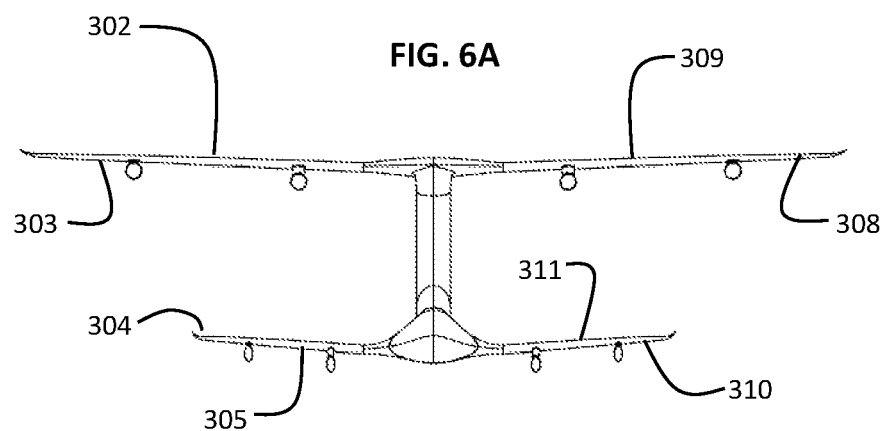
Figure 6C:
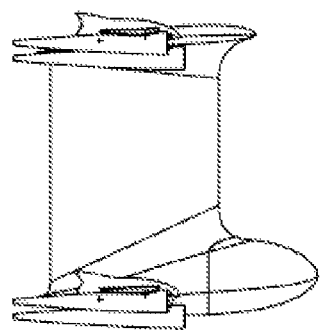

FIGS. 6A-C illustrate a second embodiment 301 of an unmanned aerial vehicle system. This second embodiment with different half wing types on the upper and lower wings illustrates an advantage of the modular aspect of the present system. Using the same aerodynamic central body pylon 105 as seen in other embodiments, the upper right wing assembly 302 and the upper left wing assembly 309 utilize regular half wings 303, 308 of the same length and other characteristics. However, the lower right wing assembly 305 and the lower left wing assembly 310 utilize short half wings 304, 311 which are considerably shorter than those of the upper wings. Such a configuration may be utilized when the mission profile demands increased stability.

Figure 7A:
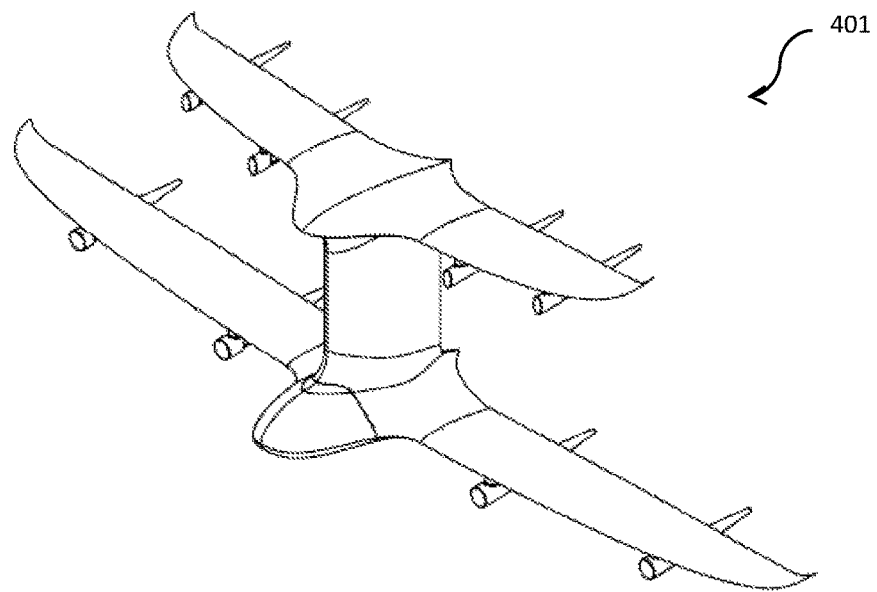
FIGS. 7A-B are views of a third embodiment of an unmanned aerial vehicle in a horizontal regular flight configuration according to some embodiments of the present invention.
Figure 7B:
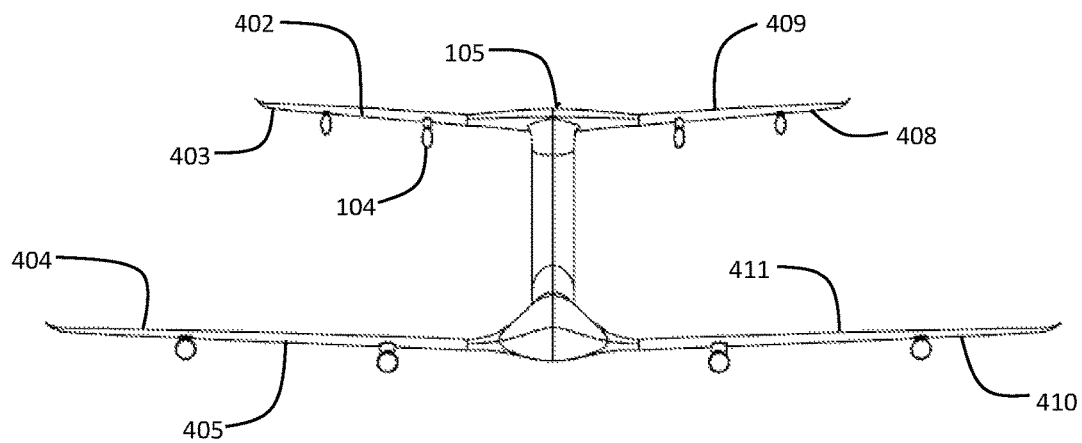

FIGS. 7A-B illustrate a third embodiment 401 of an unmanned aerial vehicle system. This third embodiment with different half wing types on the upper and lower wings illustrates an advantage of the modular aspect of the present system. Using the same aerodynamic central body pylon 105 as seen in other embodiments, the upper right wing assembly 402 and the upper left wing assembly 409 utilize short half wings 403, 408 of the same length and other characteristics. However, the lower right wing assembly 405 and the lower left wing assembly 410 utilize regular half wings 404, 411 which are considerably longer than those of the upper wings. Such a configuration may be utilized when the mission profile demands increased agility.

Of note is the adaptability of the system with a central body and two wing set types, both longer and shorter. For example, the use of two longer wing sets, both upper and lower, allows for greater range and endurance, or for higher payload capability with the same range and endurance. As discussed above, the use of a longer wing set on the top of the vehicle and a shorter wing set for the lower wing set increases stability. Also as discussed above, the use of a shorter wing set for the top wing and a longer wing set for the lower wing increases agility. Further, the use of shorter wing sets both on the top wing and on the bottom wing allows for higher speed, as certain flight missions may call for.

Figure 8A:
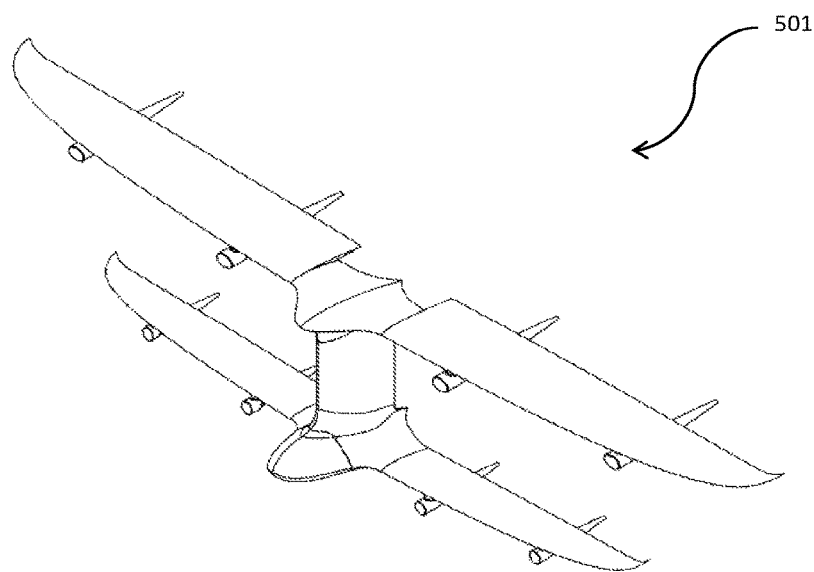
FIGS. 8A-B are views of a third embodiment of an unmanned aerial vehicle in a horizontal regular flight configuration according to some embodiments of the present invention.
Figure 8B:
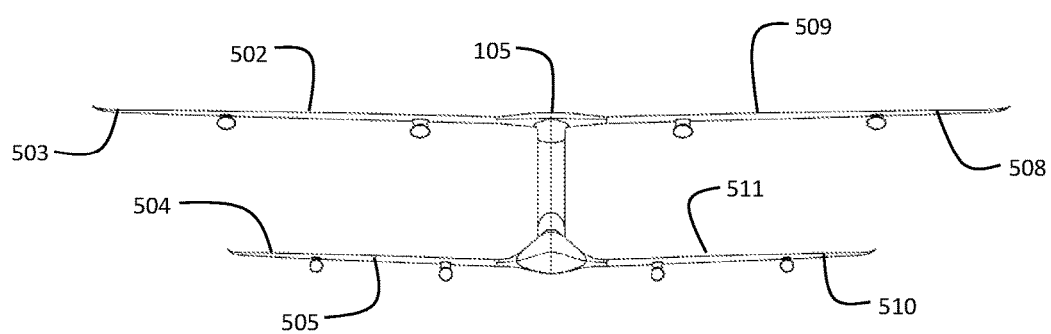

FIGS. 8A-B illustrate a fourth embodiment 501 of an unmanned aerial vehicle system. This fourth embodiment with different half wing types on the upper and lower wings again illustrates an advantage of the modular aspect of the present system. Using the same aerodynamic central body pylon 105 as seen in other embodiments, the upper right wing assembly 502 and the upper left wing assembly 509 utilize extra long half wings 503, 508 of the same length and other characteristics. However, the lower right wing assembly 505 and the lower left wing assembly 510 utilize regular half wings 504, 511 which are shorter than those of the extra long upper wings. Such a configuration may be utilized when the mission profile demands increased agility, but may also provide substantially extra payload capacity relative to the second configuration.

Figure 9A:
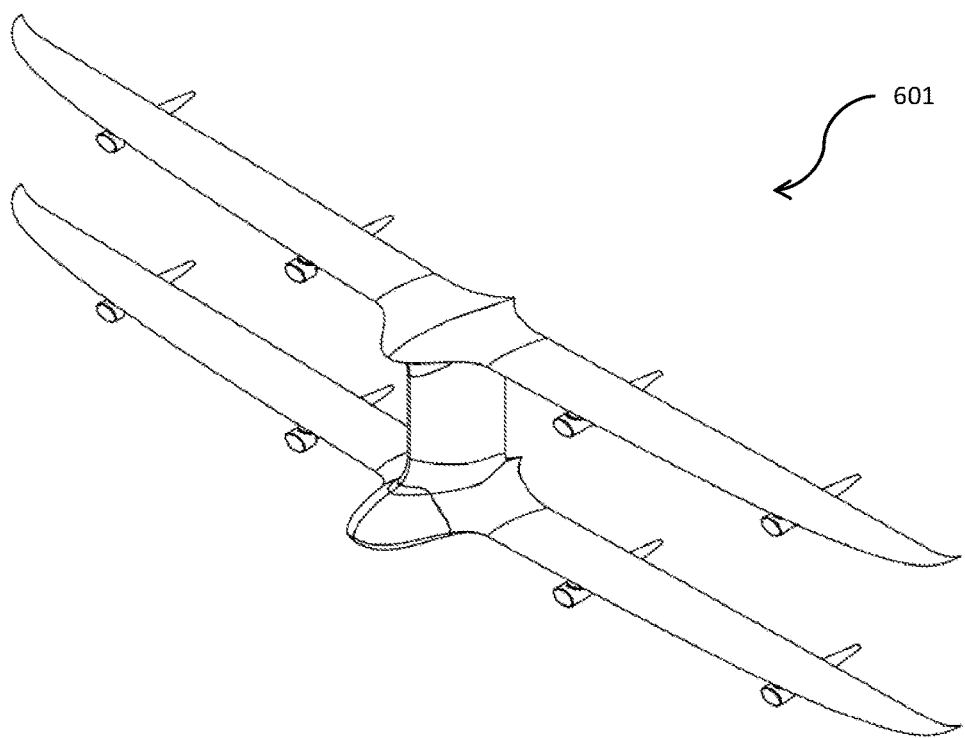
FIGS. 9A-B are views of a fourth embodiment of an unmanned aerial vehicle in a horizontal regular flight configuration according to some embodiments of the present invention.
Figure 9B:
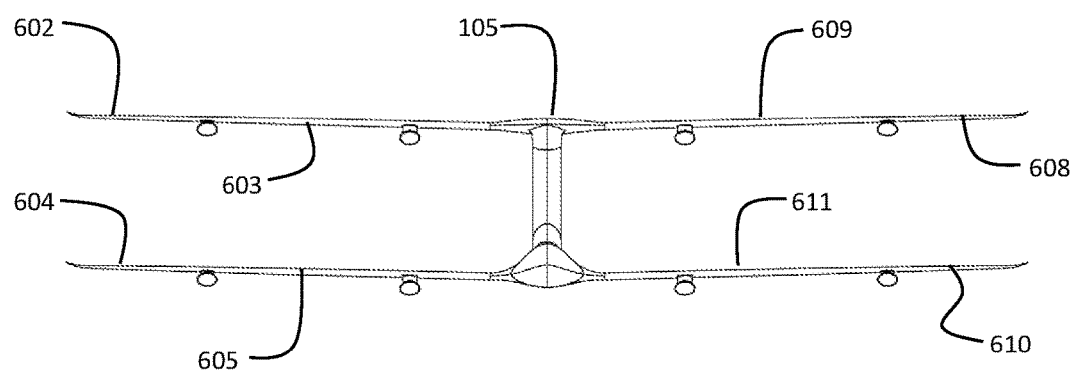

FIGS. 9A-B illustrate a fourth embodiment 601 of an unmanned aerial vehicle system. This fifth embodiment with the same half wing types on the upper and lower wings again illustrates an advantage of the modular aspect of the present system. Using the same aerodynamic central body pylon 105 as seen in other embodiments, the upper right wing assembly 502 and the upper left wing assembly 509 utilize extra long half wings 503, 508 of the same length and other characteristics. The lower right wing assembly 505 and the lower left wing assembly 510 also utilize extra long half wings 504, 511 which are the same length as those of the upper wings. Such a configuration may be utilized when the mission profile demands increased range and endurance, or significantly enhanced payload capability.

Figure 10A:
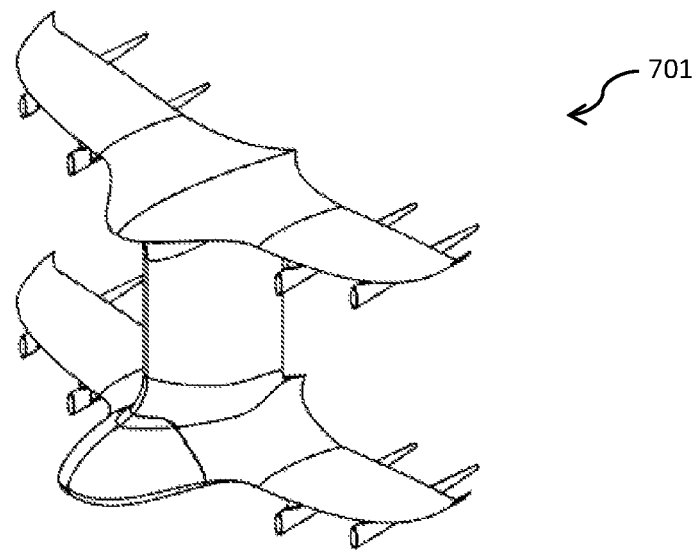
FIGS. 10A-B are views of a fifth embodiment of an unmanned aerial vehicle in a horizontal regular flight configuration according to some embodiments of the present invention.
Figure 10B:
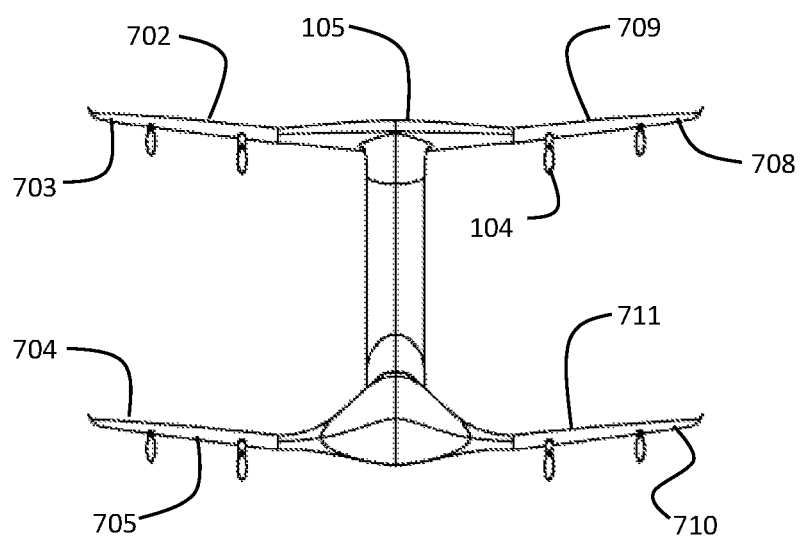
Figure 11A:
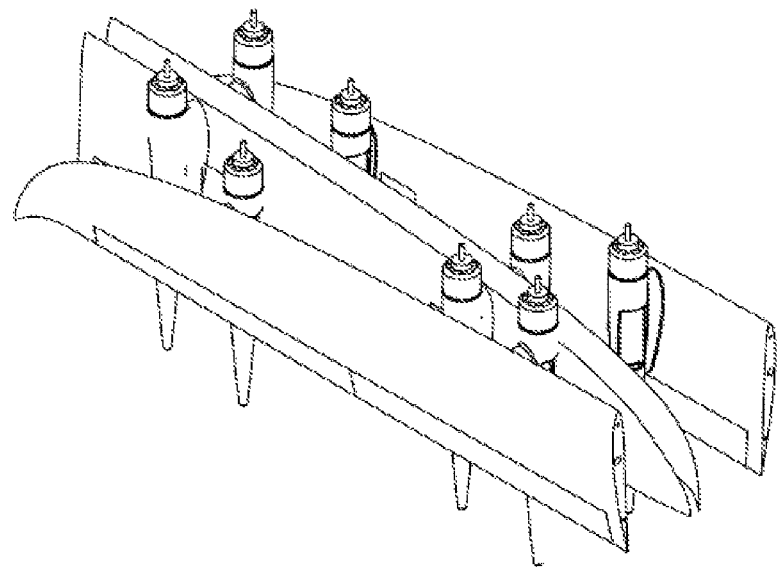
FIGS. 11A-B are views of a close packed wing set according to some embodiments of the present invention.
Figure 11B:
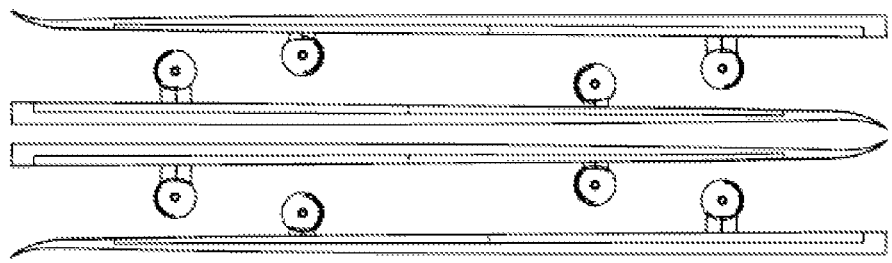
Figure 12A:
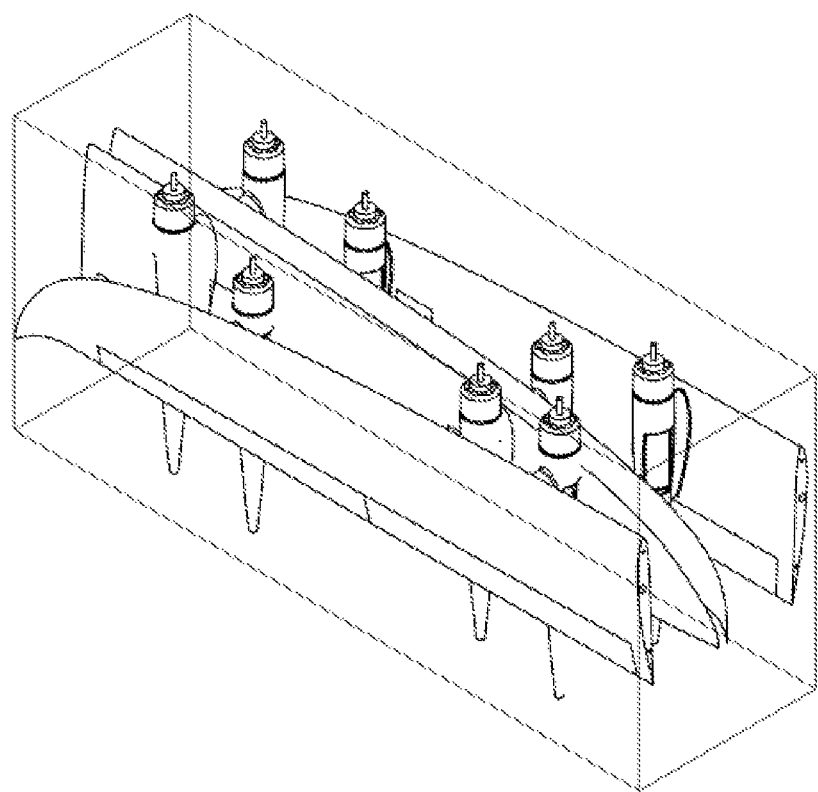
FIGS. 12A-B are views of close packed wing set in a carrying box according to some embodiments of the present invention.
Figure 12B:
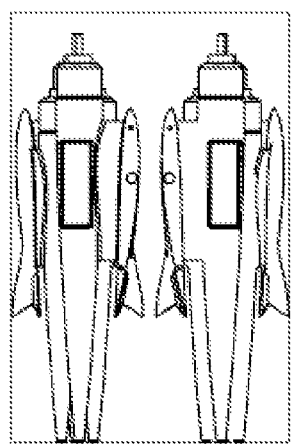

FIGS. 10A-B illustrate a sixth embodiment 701 of an unmanned aerial vehicle system. This sixth embodiment with the same half wing types on the upper and lower wings again illustrates an advantage of the modular aspect of the present system. Using the same aerodynamic central body pylon 105 as seen in other embodiments, the upper right wing assembly 602 and the upper left wing assembly 609 utilize short half wings 603, 608 of the same length and other characteristics. The lower right wing assembly 605 and the lower left wing assembly 610 also utilize short half wings 604, 611 which are the same length as those of the upper wings. Such a configuration may be utilized when the mission profile demands increased speed.

FIGS. 11A-B and 12A-B illustrate the compact way in which half wing assemblies may be stored for transport. As seen above, a system with two full sets (upper and lower) of half wings of two different sized (regular and short) allows for four separate configurations. Thus, a single vehicle system with two wing sets allows for four configurations, which allows for customization of the vehicle for a variety of flight profile needs.

Figure 13A:
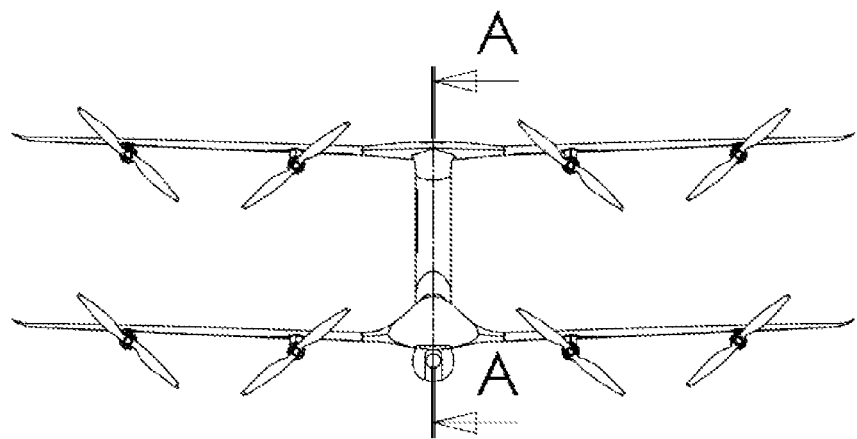
FIGS. 13A-B are views of equipment within the central pylon according to some embodiments of the present invention.
Figure 13B:
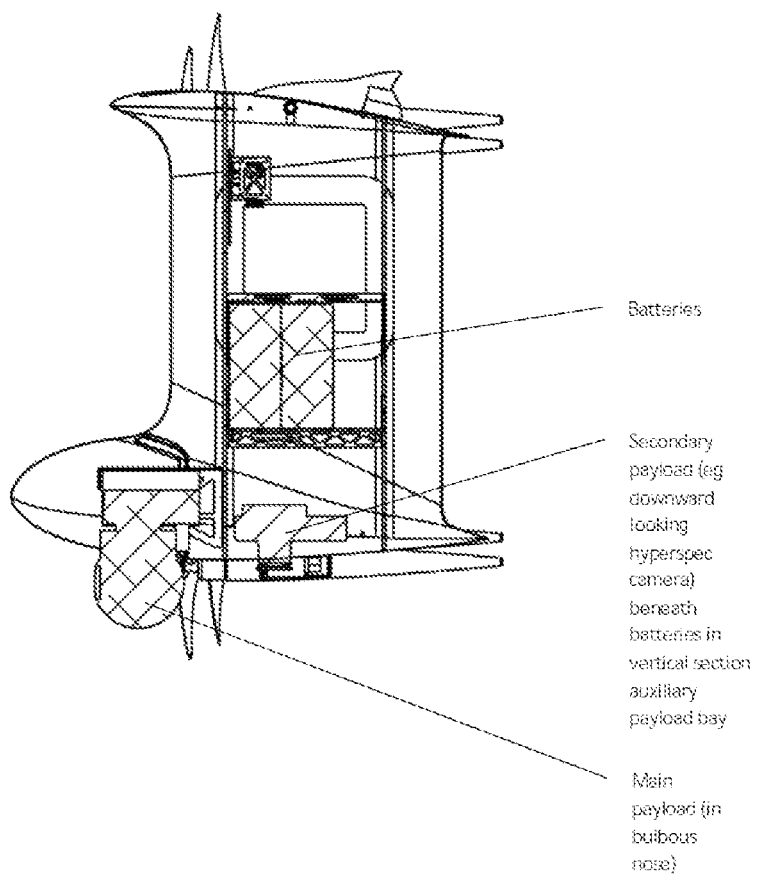

FIGS. 13A-B illustrate the interior of the aerodynamic central body pylon, including the batteries mounted just lower than the midpoint of the interior space of the central body pylon. The payload itself, which may be an imaging package, may reside partially in the central body pylon and partly within the extended nose section, or in the extended nose section.

In some aspects, a method for configuring a re-configurable aerial vehicle system may include evaluating the flight mission and flight profile parameters in order to best configure the aerial vehicle. A set of typical mission profiles may be seen in Table 1.

TABLE 1

| Mission Profile | Payload (lb) | Loiter | Cruise | Total range (miles) | Time aloft (min) |
|---|---|---|---|---|---|
| Normal loadout | 6.6 | 20 min @ 30 mph | 56 min @ 60 mph | 66 | 80 |
| Max payload | 10.6 | 20 min @ 30 mph | 15 min @ 60 mph | 25 | 39 |
| Max time aloft | 2.2 | 0 | 92 min @ 30 mph | 46 | 96 |
| Max range | 2.2 | 0 | 76 min @ 75 mph | 95 | 80 |

Based upon factors such as the payload weight, the desire for more stability, the desire for more agility, the desire for speed, the desire for more time aloft, the type of payload, and other factors, the user may configure the aerial vehicle by selection wing sets and nose sections which best suit the mission profile. The steps may include assessing the mission profile, selecting wing set types (upper and lower) based upon assessment of mission needs, selecting a nose section based upon payload requirements, assembling the aerial vehicle in concert with the identified priorities and needs, and flying the mission.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. An unmanned aerial vehicle, said unmanned aerial vehicle comprising:
    an aerodynamic central body pylon, said aerodynamic central body pylon comprising an upper end and a lower end;
    a right upper wing, said right upper wing coupled to said upper end of said aerodynamic central body pylon, said right upper wing comprising two thrust producing elements;
    a left upper wing, said left upper wing coupled to said upper end of said aerodynamic central body pylon, said left upper wing comprising two thrust producing elements;
    a right lower wing, said right lower wing coupled to said lower end of said aerodynamic central body pylon, said right lower wing comprising two thrust producing elements; and a left lower wing, said left lower wing coupled to said lower end of said aerodynamic central body pylon, said left lower wing comprising two thrust producing elements.

2. The unmanned aerial vehicle of claim 1 wherein said aerodynamic central body pylon further comprises a main body section comprising a vertical symmetric airfoil.

3. The unmanned aerial vehicle of claim 2 wherein said aerodynamic central body portion further comprises a plurality of blend sections which aerodynamically blend said vertical symmetric airfoil to said right upper wing, said left upper wing, said right lower wing, and said left lower wing.

4. The unmanned aerial vehicle of claim 1 wherein said lower end of said aerodynamic central body portion comprises a payload bay.

5. The unmanned aerial vehicle of claim 4 further comprising an extended nose section coupled to said lower end of said aerodynamic central body portion.

6. The unmanned aerial vehicle of claim 5 further comprising a payload within said payload bay.

7. The unmanned vehicle of claim 5 further comprising a payload within said extended nose section.

8. The unmanned aerial vehicle of claim 7 further comprising imaging equipment protruding from said extended nose section.

9. An unmanned aerial vehicle, said unmanned aerial vehicle comprising:
- an aerodynamic central body pylon, said aerodynamic central body portion comprising an upper end and a lower end;
- a removably attached right upper wing, said removably attached right upper wing coupled to said upper end of said aerodynamic central body pylon, said removably attached right upper wing comprising one or more thrust producing elements;
- a removably attached left upper wing, said removably attached left upper wing coupled to said upper end of said aerodynamic central body pylon, said removably attached left upper wing comprising one or more thrust producing elements;
- a removably attached right lower wing, said removably attached right lower wing coupled to said lower end of said aerodynamic central body pylon, said removably attached right lower wing comprising one or more thrust producing elements; and
- a removably attached left lower wing, said removably attached left lower wing coupled to said lower end of said aerodynamic central body pylon, said removably attached left lower wing comprising one or more thrust producing elements.

10. The unmanned aerial vehicle of claim 9 wherein said aerodynamic central body pylon further comprises a main body section comprising a vertical symmetric airfoil.

11. The unmanned aerial vehicle of claim 10 wherein said aerodynamic central body portion further comprises a plurality of blend sections which aerodynamically blend said vertical symmetric airfoil to said right upper wing, said left upper wing, said right lower wing, and said left lower wing.

12. The unmanned aerial vehicle of claim 9 further comprising an extended nose section removably attached to said lower end of said aerodynamic central body portion.

13. The unmanned aerial vehicle of claim 9 wherein the length of said left upper wing is the same as the length of said right upper wing, and wherein the length of said left upper wing is the same as said left lower wing, and wherein the length of said right upper wing is the same as said right lower wing.

14. The unmanned aerial vehicle of claim 11 wherein the length of said left upper wing is the same as the length of said right upper wing, and wherein the length of said left upper wing is the same as said left lower wing, and wherein the length of said right upper wing is the same as said right lower wing.

15. The unmanned aerial vehicle of claim 9 wherein the length of said left upper wing is the same as the length of said right upper wing, and wherein the length of said left upper wing is longer than said left lower wing, and wherein the length of said right upper wing is longer than said right lower wing, and wherein the length of said left lower wing is the same as the length of said right lower wing.

16. The unmanned aerial vehicle of claim 11 wherein the length of said left upper wing is the same as the length of said right upper wing, and wherein the length of said left upper wing is longer than said left lower wing, and wherein the length of said right upper wing is longer than said right lower wing, and wherein the length of said left lower wing is the same as the length of said right lower wing.

17. The unmanned aerial vehicle of claim 9 wherein the length of said left upper wing is the same as the length of said right upper wing, and wherein the length of said left upper wing is shorter than said left lower wing, and wherein the length of said right upper wing is shorter than said right lower wing, and wherein the length of said left lower wing is the same as the length of said right lower wing.

18. The unmanned aerial vehicle of claim 11 wherein the length of said left upper wing is the same as the length of said right upper wing, and wherein the length of said left upper wing is shorter than said left lower wing, and wherein the length of said right upper wing is shorter than said right lower wing, and wherein the length of said left lower wing is the same as the length of said right lower wing.

* * * * *